United States Patent
Strauven

(10) Patent No.: US 9,815,729 B2
(45) Date of Patent: Nov. 14, 2017

(54) CELLULAR CERAMIC PLATES WITH ASYMMETRICAL CELL STRUCTURE AND MANUFACTURING METHOD THEREOF

(71) Applicant: PITTSBURGH CORNING EUROPE NV, Tessenderlo (BE)

(72) Inventor: Hans Strauven, Lummen (BE)

(73) Assignee: Pittsburgh Corning Europe NV, Tessenderlo (BE)

(*) Notice: Subject to any disclaimer, the term of this patent is extended or adjusted under 35 U.S.C. 154(b) by 126 days.

(21) Appl. No.: 14/179,085

(22) Filed: Feb. 12, 2014

(65) Prior Publication Data

US 2014/0338399 A1 Nov. 20, 2014

Related U.S. Application Data

(63) Continuation of application No. 12/994,004, filed as application No. PCT/EP2009/056329 on May 25, 2009, now abandoned.

(60) Provisional application No. 61/055,733, filed on May 23, 2008.

(30) Foreign Application Priority Data

May 23, 2008 (GB) .................. 0809441.9

(51) Int. Cl.
- *C03B 19/08* (2006.01)
- *C03B 35/16* (2006.01)
- *C03B 25/08* (2006.01)

(52) U.S. Cl.
CPC .............. *C03B 19/08* (2013.01); *C03B 25/08* (2013.01); *C03B 35/163* (2013.01)

(58) Field of Classification Search
CPC ...................................................... C03B 19/08
See application file for complete search history.

(56) References Cited

U.S. PATENT DOCUMENTS

| | | |
|---|---|---|
| 2,401,582 A | 6/1946 | Owen |
| 3,224,853 A | 12/1965 | Pietsch |
| 4,952,227 A * | 8/1990 | Herrington ......... C03B 23/0302 65/162 |
| 5,755,849 A | 5/1998 | Hoshino et al. |
| 7,582,236 B2 | 9/2009 | Yamazaki et al. |

(Continued)

FOREIGN PATENT DOCUMENTS

| | | |
|---|---|---|
| CN | 1157805 | 8/1997 |
| CN | 101023037 | 8/2007 |
| EP | 0 254 557 | 1/1988 |

OTHER PUBLICATIONS

International Search Report in PCT/EP2009/056329, Oct. 2, 2009.

(Continued)

*Primary Examiner* — Angela Ortiz
*Assistant Examiner* — Russell Kemmerle, III
(74) *Attorney, Agent, or Firm* — Reed Smtih LLP

(57) ABSTRACT

A method for the continuous production of a cellular ceramic plate having asymmetric cells comprising thermally treating ceramic particles and a blowing agent in a foaming furnace while conveying said ceramic particles and said blowing agent at a first speed thereby forming a cellular ceramic plate, and annealing said cellular ceramic plate in an annealing lehr by cooling it down while conveying it at a second speed, larger than said first speed, thereby stretching and cooling said cellular ceramic plate.

8 Claims, 1 Drawing Sheet

(56) References Cited

U.S. PATENT DOCUMENTS

2005/0073071 A1    4/2005   Yamazaki et al.
2008/0041104 A1    2/2008   Frank

OTHER PUBLICATIONS

International Preliminary Report on Patentability in PCT/EP2009/056329, Jul. 15, 2010.
Chinese Office Action in Chinese application CN 200980128376.8, dated Jan. 30, 2013, English Translation.
Varshneya, Arun K., "Fundamentals of Inorganic Glasses", Book, Second edition, The Society of Glass Technology, 2006.
EPO Examination Report for European Patent Application No. 09 749 946. 1-1218. Sep. 7, 2011.

\* cited by examiner

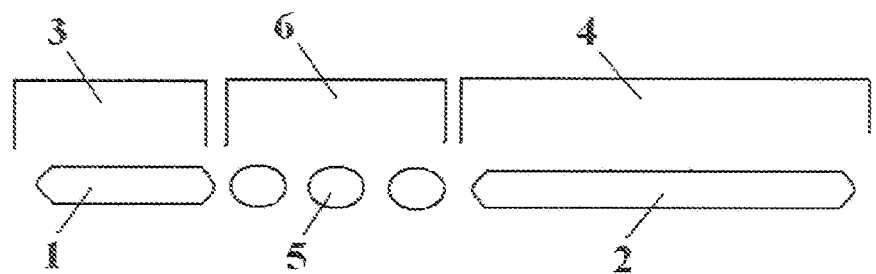

CELLULAR CERAMIC PLATES WITH ASYMMETRICAL CELL STRUCTURE AND MANUFACTURING METHOD THEREOF

CROSS-REFERENCE TO RELATED APPLICATIONS

This application is a continuation and claims the benefit under 35 U.S.C. §120 of U.S. application Ser. No. 12/994,004, filed Nov. 22, 2010 which claims benefit to a 371 of International Application No. PCT/EP2009/056329, filed May 25, 2009 which claims priority from prior U.S. Provisional Application No. 61/055,733, filed May 23, 2008 and GB Application No. 0809441.9, filed May 23, 2008, the entire contents of which are incorporated herein by reference.

FIELD OF THE INVENTION

The present invention relates to methods and apparatus for the continuous production of cellular ceramic products (e.g. cellular ceramic plates such as glass foam plates). The present invention also relates to cellular ceramic products obtained by such method.

TECHNICAL BACKGROUND

There are several methods known for the manufacture of cellular ceramic materials involving foaming. Examples are:
a) insertion (incorporation e.g. injection) and mechanical distribution of gases in a low viscosity melt.
b) Release and expansion of dissolved gases in a low viscosity melt under vacuum.
c) Insertion (incorporation) of foaming agents in a melt.
d) Mixing glass powder with a foam agent and subsequent heating.

In the case of the last glass foaming process, the manufacturing equipment typically comprises a foaming furnace with a belt carrying the glass powder and foam, and a powder loading apparatus. The foaming involves the foaming of either thick or thin plates.

SUMMARY OF THE INVENTION

The present invention results from the observation that stretching of cellular ceramic products (such as foam glass) during production brings about changes in the physical properties of the final material such as the thermal insulation of the cellular ceramic product (such as glass foam). Adaptation of these physical properties is therefore possible. This is advantageous as it permits the properties of the glass to be tailored to customer needs (e.g. stretching lowers the thermal conductivity, i.e. improves insulation properties). In a first aspect, the present invention relates to a method for the continuous production of a cellular ceramic plate (e.g. a one-piece ceramic plate) comprising:
a) thermally treating ceramic particles and a blowing agent in a foaming furnace while conveying said ceramic particles and said blowing agent at a first speed to thereby form a cellular ceramic plate, and
b) annealing said cellular ceramic plate in an annealing lehr by cooling it down while conveying it at a second speed, larger than said first speed, thereby stretching and cooling said cellular ceramic plate.

In an embodiment of the first aspect, the present invention relates to a method wherein prior to step (b), the (one-pieced) cellular ceramic plate is transferred from said foaming furnace to said annealing lehr via an intermediate conveyor at a third speed higher or equal to said second speed. This is advantageous as it enables the stretching of the cellular ceramic plate to be performed in a zone of relatively high temperature without the need for the annealing conveyor (second conveyor) to be resistant to said relatively high temperature. Stretching at relatively low temperatures induces more stress in the foam than stretching at relatively high temperatures. Preferably, only the intermediate conveyor, which can be shorter (e.g. much shorter) than the annealing conveyor, is adapted to be resistant to said relatively high temperature. Since the annealing requires a relatively long conveyor, it is economical to use an annealing conveyor which is not adapted to be resistant to relatively high temperatures (e.g. when an intermediate conveyor is used, a second conveyor resistant to a temperature up to 600° C. is enough and there is no need to use a second conveyor resistant to a temperature up to 800° C. or 900° C. in the long annealing lehr).

In an embodiment of the first aspect, the present invention relates to a method wherein the difference between the second speed and the first speed may be 25% or less of the first speed, preferably between 1 and 25%, more preferably between 2 and 20%, most preferably between 3 and 15%. Stretching in these ranges provides improvement in heat insulation (lower k-values) while simultaneously keeping the amount of breakage relatively low. In general, to decrease breakage at high speed differences, a higher stretching temperature is helpful.

In an embodiment of the first aspect, the present invention relates to a method wherein the difference between the third and second speed is between 0 and 10% or between 1 and 10%), 0 to 5% (or 1 to 5%) being preferred. Some pre-stretching is advantageous as it allows the one-pieced cellular ceramic plate to shrink during the annealing, thereby releasing stress and reducing the fracture tendency.

In an embodiment of the first aspect, the present invention relates to a method wherein the stretching is between 3 and 15%. This is advantageous as it is in this range that the ceramic cellular plate formed has simultaneously acceptable compressive strength and improved insulation properties in comparison with an otherwise identical non-stretched cellular ceramic plate.

In an embodiment of the first aspect, the present invention relates to a method wherein the cellular ceramic plate may be a glass foam plate.

The foaming step may produce open or closed cells. For insulating purposes closed cells are preferred. In the case of foamed glass, open cells can be obtained by addition of some crystalline material (such as e.g. $TiO_2$) to the amorphous glass powder. For instance, adding around 1% $TiO_2$ during grinding (e.g. in a ball mill) of the glass can lead to 100% open cells in a glass foam. When closed cells are required, the addition of $TiO_2$ or similar crystalline material is preferably avoided.

In a second aspect, the present invention relates to an apparatus for the continuous production of a cellular ceramic plate comprising:
a) a foaming furnace for thermally treating ceramic particles and a blowing agent while conveying at a first speed to thereby form a cellular ceramic plate, and
b) an annealing lehr for annealing said cellular ceramic plate by cooling it down while conveying it at a second speed, larger than said first speed, thereby stretching and cooling said cellular ceramic plate.

In other words, the second aspect of the present invention relates to an apparatus for the continuous production of a cellular ceramic plate comprising:
  a) a foaming furnace for thermally treating ceramic particles and a blowing agent, said foaming furnace comprising a first conveyor adapted for conveying at a first speed (i.e. linear speed) while heating said ceramic particles and said blowing agent to form a cellular ceramic plate, and
  b) an annealing lehr for annealing said cellular ceramic plate by cooling it down, said annealing lehr being downstream from said foaming furnace and comprising a second conveyor adapted for conveying said cellular ceramic plate at a second speed (i.e. linear speed), larger than said first speed.

For the purpose of obtaining a second linear speed higher than the first linear speed, independent driving means may be provided for said first and said second conveyor.

In an embodiment of the second aspect, the apparatus further comprises an intermediate conveyor prior to the second conveyor for transferring the cellular ceramic plate from said first conveyor (e.g. from said foaming furnace) to said second conveyor (e.g. from said annealing lehr). The presence of the intermediate conveyor between said first and second conveyors permits the use of a second conveyor with lower heat resistance than were said second conveyor to be directly adjacent to the first conveyor. This is particularly advantageous in view of the resulting reduced costs per unit length, which is important in view of the relatively large length of the second conveyor when compared to the intermediate conveyor.

In embodiments of the second aspect, where an intermediate conveyor is present, it may be adapted for conveying at a third linear speed higher or equal to said second speed. In other words, it may be driven at said third speed higher or equal to said second speed. This is advantageous as it permits the stretching of the cellular ceramic plate to be performed in a zone of relatively high temperature without the need for the annealing conveyor (second conveyor) to be resistant to relatively high temperatures. A stretching performed at a relatively high temperature leads to less stress than a stretching performed at a relatively low temperature.

For the purpose of obtaining a third linear speed higher than said second speed, independent driving means may be provided for said third conveyor.

In embodiments of the second aspect of the present invention, the first and second conveyors may be adapted for being driven in such a way that the difference between the second speed and the first speed is 25% or less of the first speed, preferably between 1 and 25%, more preferably between 2 and 20%, most preferably between 3 and 15%. In other words, the first and second conveyors may be driven in such a way that the difference between the second speed and the first speed is 25% or less, preferably between 1 and 25%. In some embodiments this difference can be between 5 and 25%.

In embodiments of the second aspect where an intermediate conveyor is present, the difference between the third and second speed may be between 0 and 10%, with between 0 and 5% being preferred.

In embodiments of the second aspect of the present invention, the first conveyor may be adapted to be resistant to higher temperature than the second conveyor. This is advantageous as the temperature in the foaming zone is higher than the temperature in the annealing zone.

In embodiments of the second aspect of the present invention, the first conveyor may be adapted to be resistant to a temperature up to 800° C., preferably up to 900° C. and the second conveyor may be adapted to be resistant to a temperature up to 600° C. These temperatures are typical maximal temperatures for the foaming and the annealing step respectively.

In embodiments of the second aspect of the present invention, the intermediate conveyor may comprise rolls. The preferred distance between two rolls can vary in function of many parameters and is preferably set via trial and error. Typically, this distance can be from 0.2 m to 1.5 m. In some embodiment, the distance between two rolls can be from 0.2 to 0.4 m. In other embodiments, the distance between two rolls can be at least 0.8 m and less than 1.5 m.

This is advantageous because within this range, the distance is large enough to reduce the number of rolls and therefore the number of friction zones between the cellular ceramic plate and the conveyors. This friction causes dust. For larger distances between the rolls, the risk of jam-up in case of breakage of the cellular ceramic plate becomes significantly higher. A roll conveyor is advantageous because it is easier to construct than belt conveyors and it leads to less jam up of broken cellular ceramic plates when used at relatively high temperature (for foam glass, this is especially true above 450° C.).

In embodiments of the second aspect of the present invention, the intermediate conveyor may be situated at the beginning of the annealing lehr or in an intermediate lehr situated between the foaming furnace and the annealing lehr.

It is advantageous to adapt the apparatus in such a way that substantially no temperature gradient (e.g. at least perpendicularly to the conveying direction) exists in the zone of the apparatus where stretching occurs (e.g. between the first and the second conveyor if no intermediate (third) conveyor is present or between the first and the intermediate (third) conveyor if an intermediate conveyor is present). This way, fracture of the cellular ceramic plate during and after production is minimised.

In embodiments of the second aspect of the present invention where an intermediate conveyor is present, the intermediate (third) conveyor may be resistant to temperatures in the range 600° C.-800° C., preferably in the range 600° C.-900° C.

This is advantageous as the presence of an intermediate (third) conveyor ensures a more reliable transition between the first conveyor and the second conveyor.

In a third aspect, the present invention relates to cellular ceramic plate having a cell structure, whereby the cells are asymmetrical, e.g. elongated. In an embodiment, the longest dimension of the cells (e.g. the length) may on average be larger than the shortest dimension of the cell (e.g. its dimension perpendicular to the surface of the plate (height)). In embodiments of the present invention this ratio between the average largest dimension of the cells and the average shortest dimension of the cells may be from 1.2 to 2.5. An advantageous ratio has been found to be between 1.2 and 1.6 as it provides a trade off between insulation properties and mechanical properties. For the purpose of the present invention, this difference in length between the average largest dimension and the average smallest dimension has been measured with ultrasonic measurements. For instance, the ratio of ultrasonic transit times measured lengthwise (in the direction of the conveying and stretching) on ultrasonic transit times measured heightwise (perpendicular to the glass foam surface) has been found to be about 1.4 for glass foam exhibiting a thermal conductivity of 0.042 W/mK at 10° C. with a density of 115 kg/m$^3$.

In an embodiment of the third aspect, the cellular ceramic plate may have an asymmetrical cell structure and may be obtainable by any of the methods of the first aspect of the present invention.

In an embodiment of the third aspect, the cellular ceramic plate may be a glass foam plate and/or be a closed cell foam.

BRIEF DESCRIPTION OF THE DRAWINGS

FIG. 1 schematically shows an apparatus according to an embodiment of the present invention.

DESCRIPTION OF THE ILLUSTRATIVE EMBODIMENTS

Although the present invention will be described in connection with certain embodiments, it is not intended to be limited to the specific form set forth herein. Rather, the scope of the present invention is limited only by the accompanying claims. In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

Definitions:

Types of "Cellular Ceramics" include but are not limited to carbon foams, glass foams, and cellular concrete. Glass foams have a combination of unique qualities including rigidity, compressive strength, thermal insulation, non-flammability, chemical inertness, water/steam resistance, insect/rodent resistance, and are generally lightweight. Glass foams are generally formed by the action of a gas-generating agent (e.g. foaming agent), which is mixed with ground glass (i.e., glass particles). This mixture is heated to a temperature at which the evolution of gas from the foaming agent occurs within the softened glass. The gas evolved creates bubbles which form the cells (e.g. pores) in the final glass foam. Cellular ceramics according to the present invention preferably have a density which is from 2 to 45%, preferably 3 to 25%, more preferably 4 to 10%, of the density of the corresponding plain (non-cellular) ceramic. In the case of foam glass, the density of the glass obtained is preferably from 50 to 1000 Kg/m$^3$, preferably from 75 to 600 Kg/m$^3$, most preferably from 90 to 250 Kg/m$^3$ or 100 to 250 Kg/m$^3$.

As used herein and unless provided otherwise, the term "plate", when relating for instance to cellular ceramic plates, relates to a three-dimensional object, wider than thick and of any length. In the context of the first aspect of the present invention, the term "plate" refers to a continuous one-pieced plate until it is cut after or at the end of the annealing step. The term "plate" as used in the context of the third aspect of the present invention, refers either to said continuous one pieced plate or to a shorter plate as obtained after transversal cutting of said continuous plate.

As used herein and unless provided otherwise, the term "resisting" when relating to a temperature applied to a conveyor, means that the conveyor does not substantially deform when exposed to said temperature for an extended period. For instance, when the conveyor is a belt conveyor, the elongation of the belt should preferably not be more than 1% over a 120 days period at said temperature.

The term foaming furnace, as used in disclosing the present invention, means a furnace in which cellular ceramic (e.g. foamed glass) is produced.

In a first aspect, the present invention relates to a method for the continuous production of a (one-piece) cellular ceramic plate. By continuous production, is meant the production of a one-piece (continuous) cellular ceramic plate, as opposed to batch-wise production methods such as e.g., moulding. In the continuous production processes according to the first aspect of the present invention, a single piece of cellular ceramic plate is produced which is cut into plates of well-defined length at the end of the annealing step or after the annealing step.

In embodiments of the present invention, said method comprises the steps of: (a) thermally treating ceramic particles and a blowing agent in a foaming furnace thereby forming a cellular ceramic plate, and (b) annealing said cellular ceramic plate in an annealing lehr by cooling it down. In a preferred embodiment, the cellular ceramic plate is a glass foam plate.

In an embodiment, the thermal treatment can be heating up the ceramic particles and the blowing agent to a temperature high enough to induce the formation of a cellular ceramic material. This temperature can for instance, be comprised between 650 and 850° C. in the case of glass foam, with from 700 to 800° C. being preferred. The ceramic particles may have any shape, size or aspect ratio known in the art to permit the production of cellular ceramic bodies. The ceramic particles specific surface area is preferably from 0.5 m$^2$/g to 1 m$^2$/g as measured by Brunauer Emmett Teller (BET)-analysis. Blowing agents usable in embodiments of the first aspect of the present invention comprise any blowing agent known in the art enabling the production of cellular ceramic bodies. They can comprise but are not limited to carbon black and carbonates (e.g. calcium carbonate or sodium carbonate). The proportion of blowing agent to ceramic particles can be any proportion known in the art to permit the production of cellular ceramic bodies. Preferably, it is between 0.1% and 2%. For carbon black, it is preferably from 0.2 to 0.6% and particularly preferably from 0.3 to 0.5%. For carbonates, it is preferably between 0.7 and 1.3%, preferably from 0.8 to 1.2%.

In embodiments of the present invention, the annealing step may be a slow temperature decrease according to a prescribed temperature profile.

Although this is not the object of the present invention, the temperature profile of the whole foaming and annealing process has an influence on the appearance of defects in the foamed glass product obtained via a stretching procedure as described herein. The fine-tuning of this temperature profile is a question of trial an error and is well within the skills of the person skilled in the art without undue experimental effort. In general, the purpose of these temperature profiles is to relax at a smaller temperature gradient to reduce residual strain. It is also advantageous to have smooth temperature transitions between the different sections of the apparatus.

In a preferred embodiment of the first aspect of the present invention, step (a) is performed while conveying said ceramic particles and said blowing agent at a first speed thereby forming a ceramic plate and step (b) is performed while conveying said cellular plate obtained in (a) at a second speed, larger than said first speed, thereby stretching said cellular plate. The first speed can, for instance, range from 1 to 100 cm/min depending upon the ceramic material foamed and the plate thickness to be produced. For instance, it can range from 1 to 15 cm/min in some embodiments. In embodiments of the present invention, the use of a first conveyor conveying the foam at a first speed in the foaming zone and the use of a second conveyor in the annealing zone conveying the foam at a second speed higher than said first speed, permits the cellular ceramic foam, e.g. the glass foam, to be stretched.

In an embodiment of the present invention, the speed of the second conveyor, i.e. the speed of the annealing conveyor, is higher than the speed of the foaming conveyor (i.e. the first conveyor). Especially during the production start (e.g. when the production has been interrupted and must be restarted), it is very advantageous to have a distinctly higher (e.g. between 3 and 20% higher, preferably between 4 and 20% higher, more preferably 7%-20% higher, for instance 8% or higher) second conveyor speed in the lehr than in the first conveyor in the foaming zone. After the production start, the second conveyor speed can be reduced to be, for instance, around 3%. The difference between the first speed and the second speed is preferably 25% or less, more preferably between from 3 to 25% or from 5 to 25%. As an example, it has been shown that stretching a continuous glass foam string during production by up to 20%, e.g. up to 10%, reduces the k-value and decreases the compressive strength in embodiments of the present invention, the preferred stretching is between 3 and 25% (e.g. between 5 and 25%).

In an embodiment of the present invention, the stretching of the foam is obtained by using separate conveyors for the foaming and for the annealing of the foamed glass.

In an embodiment of the first aspect of the present invention, prior to step (b) and after step (a), the cellular plate is transferred from said foaming furnace to said annealing lehr via an intermediate conveyor. Preferably, said intermediate conveyor conveys at a third speed higher or equal to said second speed. Preferably, the difference between the third speed and the second speed is between 0 and 10% of the second speed. In another embodiment of the present invention, the intermediate conveyor (e.g. the rolls of the intermediate conveyor when it comprises rolls) may be coupled with the second conveyor in such a way that the linear speed of the intermediate conveyor equals that of the second conveyor. As a consequence, the stretching occurs between the first conveyor (e.g. a foaming belt) and the intermediate conveyor (e.g. the 1$^{st}$ roll of the intermediate conveyor), where the temperature is higher. As an optional feature, a pre-stretch of the foam by using a speed for the intermediate conveyor up to a value a few % of the second speed higher (e.g. between 1 and 10%, for instance 5%) than the value in the annealing lehr is performed between the first and the intermediate conveyor. This allows the foam to shrink in the lehr and the final stretching is the stretching due to the difference in speed between the first conveyor and the second conveyor. Shrinking of the ceramic cellular material in the lehr reduces stress and breakage.

For all embodiments of the first aspect of the present invention, it is preferred that the temperature distribution across the width of the cellular ceramic plate is as uniform as possible in the zone where the stretching occurs. In embodiments, the temperature distribution across the width of the cellular ceramic plate span 20° C. or less in the zone where the stretching occur. This can be obtained, for instance, by isolating said zone from the rest of the apparatus (avoiding drafts (e.g. air and flue gas currents)) and/or by adapting the position of heaters with individual temperature control. In an embodiment, the zone where the stretching occurs (e.g. the zone in between the first conveyor and the intermediate conveyor) is adapted to experience a local minimum of currents. This means that zones situated directly upstream or downstream from said zone where the stretching occurs, experience more drafts than said zone where the stretching occurs.

In a second aspect, the present invention relates to an apparatus for the continuous production of a cellular ceramic plate. This apparatus is adapted to perform the steps of the method of the first aspect. The apparatus of the present invention comprises a foaming furnace and an annealing lehr. The foaming furnace is suitable for thermally treating ceramic particles and a blowing agent. The treatment temperature may vary depending upon the nature of the particles used. For instance, in the case of glass particles it can be between 600° C. and 950° C. and is preferably between 650° C. and 800° C. during most of the foaming process. The annealing lehr is suitable for annealing the cellular ceramic plate by cooling it down in a controlled manner. The annealing lehr is downstream from the foaming furnace. The apparatus also comprises at least two conveyors; a first conveyor and a second conveyor. The conveyor used for the foaming will be hereafter referred to as the first conveyor. The first conveyor is situated in the foaming zone (e.g. it is comprised in said foaming furnace). A suitable conveyor for this purpose is an endless metallic belt with holes filled with a suitable ceramic material. The conveyor used for the annealing will be hereafter referred to as the second conveyor. The second conveyor is comprised in the annealing lehr. A suitable conveyor for the annealing lehr can for instance be a belt or rolls.

The length of the foaming conveyor can be for instance (in the case of glass foaming) from 35 to 75 m, e.g. from 45 to 55 m. The length of the annealing conveyor can be for instance (in the case of glass foaming) from 150 to 300 m, preferably from 200 to 280 m. In general, these dimensions can be made smaller or larger by decreasing or increasing the conveying speed respectively. Much smaller (see the example below on a pilot size line) or larger dimension are therefore useable. In embodiments of the present invention, the ratio between the length of the second conveyor and the length of the first conveyor is from 2 to 8.

In a preferred embodiment of the second aspect of the present invention, the first conveyor is adapted to convey at a first speed while the second conveyor is adapted to convey at a second speed, higher than said first speed. Preferably, the first conveyor and the second conveyor are adapted for being driven in such a way that the difference between the second speed and the first speed is 25% or less of the first speed, more preferably from 1 to 25% and most preferably from 3 to 5%. In embodiments, this difference can be from 5 to 25%. In embodiments of the present invention, stretching implies a higher speed for the second conveyor than for the first conveyor and therefore a longer lehr than were there to be no stretching. If 20% of stretching is required, a 20% longer second conveyor is preferably used. In other words, the length of the conveyor is preferably proportional to the required stretching.

In an embodiment of the second aspect of the present invention, the first conveyor is preferably adapted to be resistant to higher temperatures than said second conveyor. More preferably, the first conveyor is adapted to be resistant to a temperature up to 800° C. or even 900° C. or 950° C. A suitable first conveyor can for instance be a metallic mesh belt filled in with a suitable ceramic (e.g. a ceramic resistant to said temperature without shrinking substantially). More preferably, the second conveyor is resistant to higher temperatures up to e.g. 800° C., preferably 900° C. if no intermediate conveyor is used between the first conveyor and the second conveyor and to a lower temperature (e.g. up to 600° C.) if an intermediate conveyor is used between the first conveyor and the second conveyor. In an embodiment wherein an intermediate conveyor is used, the second conveyor may be adapted to be resistant to a temperature up to 600° C.

The second conveyor being relatively long, and the temperature at the end of the foaming zone (i.e., foaming furnace) being relatively high (up to 800° C. or even up to 900° C. or 950° C. In the case of glass foam plates), it is advantageous to have an intermediate conveyor between the foaming zone and the annealing conveyor, which is resistant to relatively high temperature (e.g. In the range 600° C.-800° C.). Hence, in some embodiments of the present invention, it is advantageous to use one or more intermediate conveyors between the first conveyor and the second conveyor. In embodiments of the second aspect of the present invention, the apparatus further comprises at least a third conveyor (also referred to as intermediate conveyor(s) in the rest of the text). Preferably a single intermediate conveyor is used and although the rest of the description will refer to a single intermediate conveyor, it applies *mutatis mutandis* to multiple intermediate conveyors. The presence of this intermediate conveyor permits the use of a less temperature-resistant and therefore cheaper second conveyor (e.g. one only resistant to temperatures up to 600° C. In the case of glass foam plates production). This is particularly advantageous in view of the relatively long length and therefore high cost of the second conveyor. Said intermediate conveyor is preferably adapted to convey at a third speed equal or higher than the second speed. In an embodiment of the present invention, a separate driving system is provided on the intermediate conveyor (e.g. on the rolls of the intermediate conveyor). As a consequence, the equipment is able to generate a different linear speed for the intermediate conveyor than for the first or second conveyor. More preferably, the difference between the third and second speed is between 0 and 10%, preferably between 0 and 5%. In a preferred embodiment of the present invention, when an intermediate conveyor comprising rolls is used between the first and the second conveyor, the rolls may be driven at such a speed that the conveying speed of the intermediate conveyor is the same or up to 10%, preferably 5% faster than the conveying speed of the second conveyor. Preferably, the intermediate conveyor is resistant to temperatures in the range 600° C.-800° C., i.e. up to 800° C., more preferably up to 850° C. The length of the intermediate conveyor can for instance be from 2% to 30% of the length of the second conveyor, preferably being from 3% to 20% of the length of the second conveyor. The intermediate conveyor preferably comprises rolls. This is advantageous as it is easier and cheaper to build and breakage is less likely with rolls when the ceramic (e.g. glass) is at a temperature high enough for it to be viscoelastic. The preferred distance between two rolls is better determined by trial and error as it depends upon many parameters. Typically it can range from 0.2 to 1.2 m. A preferred distance is from 0.2 to 0.4 m, with in some embodiments 0.6 m or more and less than 1.5 m being used, in other embodiments, 0.8 m or more and less than 1.2 m can be used. In yet other embodiments, between 0.9 and 1.2 m can be used. In some embodiments, a useful value has been found to be 0.3 m, in other embodiments, a useful value has been found to be 1 m. The intermediate (third) conveyor is placed prior to (i.e. upstream from) the second conveyor, it is preferably situated at the beginning of the annealing lehr or in an intermediate lehr situated between the foaming zone/furnace and the annealing lehr. Said intermediate conveyor is suitable for transferring a cellular ceramic plate from the foaming furnace to the annealing lehr. In an embodiment of the present invention, transversal temperature gradients (temperature differences across the plate) where stretching occurs are preferably avoided. Preferably, the transversal temperature gradient (temperature difference across the plate) where stretching occurs is of 20° C. or less. This can for instance be achieved by installing heaters with separate temperature control at the appropriate places.

In a third aspect, the present invention relates to cellular ceramic plates having a cell structure, whereby the cells are asymmetrical. The plate obtained in the method of the first aspect is a one-piece continuous plate that can be cut in any desired dimensions after or at the end of the annealing step. Due to stretching, properties in the final material are different from those of non-stretched plates. The dimension and shape of the cells within a cellular ceramic plate (e.g. a glass foam plate) stretched according to an embodiment of the present invention are as follows: the average diameter of the cells is preferably smaller than 1 mm and the cell shape will on average be asymmetrical with one dimension larger than the other. Preferably, one dimension is larger than the other by a factor in ultrasonic transit time comprised between 1.2 and 1.6, preferably 1.3 and 1.5, e.g. about 1.4.

In an embodiment of the third aspect, the present invention relates to cellular ceramic plates obtainable by any of the methods of the first aspect of the present invention.

EXAMPLES

Example 1

Pilot Line

A glass foam plate was produced according to the first aspect of the present invention. For this example, various glass foam plates were produced with an apparatus comprising a powder loading apparatus, a foaming furnace including a first conveyor, an intermediate zone including an intermediate (third) conveyor and an annealing lehr including a second conveyor. The glass powder was applied on the foaming conveyor in an amount of 8000 cm$^2$/g. The foaming oven was 10 m long. The first conveyor was a powder-tight refractory steel belt filled with a heat-stable ceramic material. Its linear speed was ca. 3 cm/min. The temperature in the foaming furnace was between 650 and 670° C. at the beginning of the furnace and between 750 and 770° C. at the end of the furnace. The intermediate (third) conveyor was a set of water cooled rolls. The temperature in the intermediate zone was between 650 and 680° C. at the beginning of the intermediate zone and reached a maximum of 800° C. between the beginning and the end of the zone and was around 700° C. at the end of the intermediate zone. The length of the intermediate conveyor was 1 meter. Its rolls were driven at a speed about 5% higher than the speed of the second conveyor. The second conveyor was another set of rolls (the use of a belt would also have been suitable) and the temperature in the annealing lehr was about 600° C. at the beginning of the lehr down to room temperature (20-40° C.) at the end of the lehr. Its length was about 22 m. The second conveyor had a linear speed 5, 10 and 15% above the speed of the first conveyor leading to foam-glass plates having a density of 105 Kg/m$^3$ with stretching of 5, 10 and 15% respectively. The foam-glass plates could thereafter be sawed laterally and/or horizontally and/or transversally.

The relative speeds of the first, second and intermediate conveyors in these examples were as follow:

The first speed was always about 3 cm/min. For a stretch of 5, 10 or 15%, the second speeds were respectively 5, 10 or 15% higher than the first speed. The third speed (i.e. the speed of the intermediate conveyor) was 5% higher than the second speed. For a stretching up to 15%, we obtained the following results in table 1 below.

TABLE 1

| Stretch [%] | compressive strength [N/mm$^2$] | k-value [W/mK] |
|---|---|---|
| 5 | 0.9 | 0.0415 |
| 10 | 0.77 | 0.0413 |
| 15 | 0.7 | 0.0408 |

The results in table 1 show that stretching brings about a decrease in the k-value and a decrease in the compressive strength. Other densities or ceramics would give different results.

We obtained improvement in the mechanical properties with a conveying speed for the second conveyor 20% higher than for the conveying speed in the foaming furnace. This led to a stretch of 20%. In this way, we obtained foams with an approximate thickness of 16 cm at 120 kg/m$^3$.

With a set-up wherein an intermediate conveyor is used at a speed higher than the speed of the second conveyor and therefore a pre-stretching up to a first value, e.g. 25% with a net stretching equal to a second value lower than the first value, e.g. 20%, it was possible to anneal a 16 cm thick foamed glass sheet with a 120 kg/m$^3$ density without lehr breakage, only 10% delayed breakage and a defect free bottom at 3.18 cm/min for the first conveyor.

FIG. 1 schematically shows an apparatus according to an embodiment of the present invention.

In this FIGURE, a first conveyor 1, a second conveyor 2, and an intermediate conveyor 5 are shown. The first conveyor 1 conveyed the foaming glass through the foaming furnace 3 and transferred the foamed-glass ribbon to the intermediate conveyor 5. The intermediate conveyor 5 conveyed the foamed glass ribbon through the intermediate lehr 6 and transferred the foamed-glass ribbon to the second conveyor 2. The second conveyor 2 conveys the foamed glass ribbon through the annealing lehr 4.

The invention claimed is:

1. A method for the continuous production of a one-piece continuous cellular ceramic plate comprising:
    a) thermally treating ceramic particles and a blowing agent in a foaming furnace while conveying said ceramic particles and said blowing agent at a first speed to thereby form a one-piece continuous cellular ceramic plate,
    b) annealing said one-piece continuous cellular ceramic plate in an annealing lehr by cooling said one-piece continuous cellular ceramic plate down while conveying said one-piece continuous cellular ceramic plate at a second speed, larger than said first speed, thereby stretching and cooling said one-piece continuous cellular ceramic plate; and
    c) prior to step (b), transferring said one-piece continuous cellular ceramic plate from said foaming furnace to an annealing lehr via an intermediate conveyor at a third speed, wherein the third speed is larger than said second speed.

2. The method according to claim 1, wherein the difference between the second speed and the first speed is between 0.1% and 25% of the first speed.

3. The method according to claim 1, wherein the difference between the third and second speed is between 0.1% and 10% of the first speed.

4. The method according to claim 1, wherein the one-piece continuous cellular ceramic plate is a one-piece continuous glass foam plate.

5. The method according to claim 1, wherein the step of stretching and cooling said one-piece continuous cellular ceramic plate asymmetrically deforms cells within said one-piece continuous cellular ceramic plate.

6. The method according to claim 5, wherein after the step of stretching and cooling said one-piece continuous cellular ceramic plate, a length measurement of an average longest dimension of said cells and a length measurement of an average shortest dimension of said cells differs by a factor of between 1.2 and 1.6.

7. A method for the continuous production of a one-piece continuous cellular ceramic plate comprising:
    a) thermally treating ceramic particles and a blowing agent in a foaming furnace while conveying said ceramic particles and said blowing agent at a first speed to thereby form a one piece continuous cellular ceramic plate, and
    b) annealing said one-piece continuous cellular ceramic plate in an annealing lehr by cooling said one-piece continuous cellular ceramic plate down while conveying said one-piece continuous cellular ceramic plate at a second speed, larger than said first speed, thereby stretching and cooling said one-piece continuous cellular ceramic plate; wherein prior to step (b), the one-piece continuous cellular ceramic plate passes through a zone having substantially no temperature gradient as the cellular ceramic plate is transferred from said foaming furnace to said annealing lehr.

8. A method for the continuous production of a one-piece continuous cellular ceramic plate comprising:
    a) thermally treating ceramic particles and a blowing agent in a foaming furnace while conveying said ceramic particles and said blowing agent at a first speed to thereby form a one-piece continuous cellular ceramic plate, and
    b) annealing said one-piece continuous cellular ceramic plate in an annealing lehr by cooling said one-piece continuous cellular ceramic plate down while conveying said one-piece continuous cellular ceramic plate at a second speed, larger than said first speed, thereby stretching and cooling said one-piece continuous cellular ceramic plate; wherein prior to step (b), the one-piece continuous cellular ceramic plate passes through a zone having a temperature gradient of less than 20 degrees Celsius as the one-piece continuous cellular ceramic plate is transferred from said foaming furnace to said annealing lehr.

* * * * *